(12) United States Patent  
Iwasa

(10) Patent No.: US 6,268,968 B1  
(45) Date of Patent: Jul. 31, 2001

(54) LENS HOUSING

(75) Inventor: Kazuyuki Iwasa, Hino (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/389,307

(22) Filed: Sep. 2, 1999

(30) Foreign Application Priority Data

Sep. 4, 1998 (JP) .................................................. 10-251431  
Sep. 4, 1998 (JP) .................................................. 10-251432

(51) Int. Cl.[7] .................................................. G02B 15/14
(52) U.S. Cl. .......................................... 359/699; 359/700
(58) Field of Search .................................. 359/694, 696, 359/699, 700, 703, 704

(56) References Cited

U.S. PATENT DOCUMENTS 3,906,529  9/1975  Filipovich .............................. 396/63
5,926,324  7/1999  Oono et al. ........................... 359/696

FOREIGN PATENT DOCUMENTS 1-171412  12/1989  (JP) .
4-52628   2/1992   (JP) .
6-294921  6/1994   (JP) .

*Primary Examiner*—Ricky Mack
(74) *Attorney, Agent, or Firm*—Ostrolenk, Faber, Gerb & Soffen, LLP

(57) ABSTRACT

In an image-capturing state, a group-3 frame (a first frame member) supported by a group-2 frame (a second frame member) along a guide axis is urged by a pushing spring of an independent movable follower (a cam-follower member), is engaged with an engaging tab (an engagement), and is shifted to a determined position. In this state, the movable follower is driven along a cam groove of an F-cam frame (a driving means and/or a rotating frame), whereby the group-3 frame is driven forward and backward to individual extension positions. When the lens housing is shifted to a collapsed state, the pushing spring is pushed by a camera body, and the engagement of the cam follower is disengaged, whereby the group-3 frame is moved close to the group-2 frame. This lens housing ensures the frame members to move smoothly and, since the space occupied by the frame members is reduced, promotes miniaturization of the lens housing.

24 Claims, 7 Drawing Sheets

LENS HOUSING

BACKGROUND OF THE INVENTION

1. Field of the Invention

The present invention relates to a lens housing that contains image-capturing lenses and lens frames adapted to move forward and backward.

2. Description of the Related Art

Conventionally, a zoom-lens housing has been proposed as a lens housing that contains movable frames in Japanese Unexamined Patent Publication No. 4-52628. The proposed zoom lens housing rotates inner and outer zoom rings about an optical axis to move all lens frames forwardly and backwardly in a direction corresponding to the optical axis. According to the forward and backward movement of the lenses, the focal length of the zoom lens is varied. Further, according to the forward and backward movement of the lenses caused by the outer zoom ring, the lens housing moves a focusing-lens-group frame forward and backward to perform focusing operations.

In the above zoom lens housing the focusing lens group is moved forward and backward by the outer zoom ring. A coupling member for coupling the outer zoom ring and the focusing-lens-group frame is formed of a slender plate. The coupling member receives not only simple thrusting forces but also torsional forces in the radial direction. Responsive to these forces, the outer zoom ring (which is a frame member) and the focusing-lens-group frame are deformed. The deformations cause problems in that smooth extending and retracting operations cannot be performed, and that the aforementioned coupling member is deformed.

Also, conventionally, a collapsible lens housing that contains image-capturing lenses and has movable frames (frame members) in an image-capturing region has been proposed in Japanese Unexamined Utility Model Publication No. 11-171412. The proposed lens housing also has relief grooves formed continuously in cam grooves of a cam cylinder, which engage with cam followers provided for reduction of an inter-lens-group distance when shifting the lens housing into a collapsed-barrel state. With this lens housing, the cam followers can be engaged with the relief grooves and increase lens extension.

However, in the lens housing proposed in the Japanese Unexamined Utility Model Publication No. 11-171412, in addition to the cam grooves for moving the movable frames through the cam cylinder, relief grooves must be provided. This requires extra space, restricting the shape of the movable frames and decreasing rigidity.

SUMMARY OF THE INVENTION

In order to solve the problems described above, an object of the present invention is to provide a lens housing containing movable frame members which produces smooth and precise movement, has sufficiently rigid movable frames and allows miniaturization.

According to one aspect of the present invention, a lens housing includes frame members that are movable in a direction corresponding to an optical axis; a separate cam-follower member slidably supported in the direction corresponding to the optical axis positioned where the cam-follower member opposes and is spaced from the frame members and where the cam-follower member is engaged with the frame members; and a driving member for driving the cam-follower member. In this lens housing, the frame members are driven forward and backward via the cam-follower member.

According to another aspect of the present invention, a rotating-frame member is rotatably and movably connected to an immobilized frame and rotationally driven; a first frame member linearly movably in the rotating frame in a direction corresponding to an optical-axis relative to the immobilized frame; and a cam-follower member, movably supported in a direction corresponding to the optical axis relative to the rotating frame and the first frame member, adapted to position in a direction corresponding to an optical axis the first frame member by engaging with the first frame member and having a cam follower for engaging with cams of the rotating frame, whereby a rotational driving force of the rotating frame is converted and transmitted for moving the first frame member linearly. In this lens housing, the first frame member is driven forward and backward in a direction corresponding to the optical axis according to rotation of the rotating frame member via the cam-follower member.

Other characteristics and advantages of the present invention will be clarified sufficiently according to the description below.

DESCRIPTION OF THE PREFERRED EMBODIMENT

Hereinbelow, a description will be given of an embodiment of the present invention with reference to the drawings described above.

Figure 1:
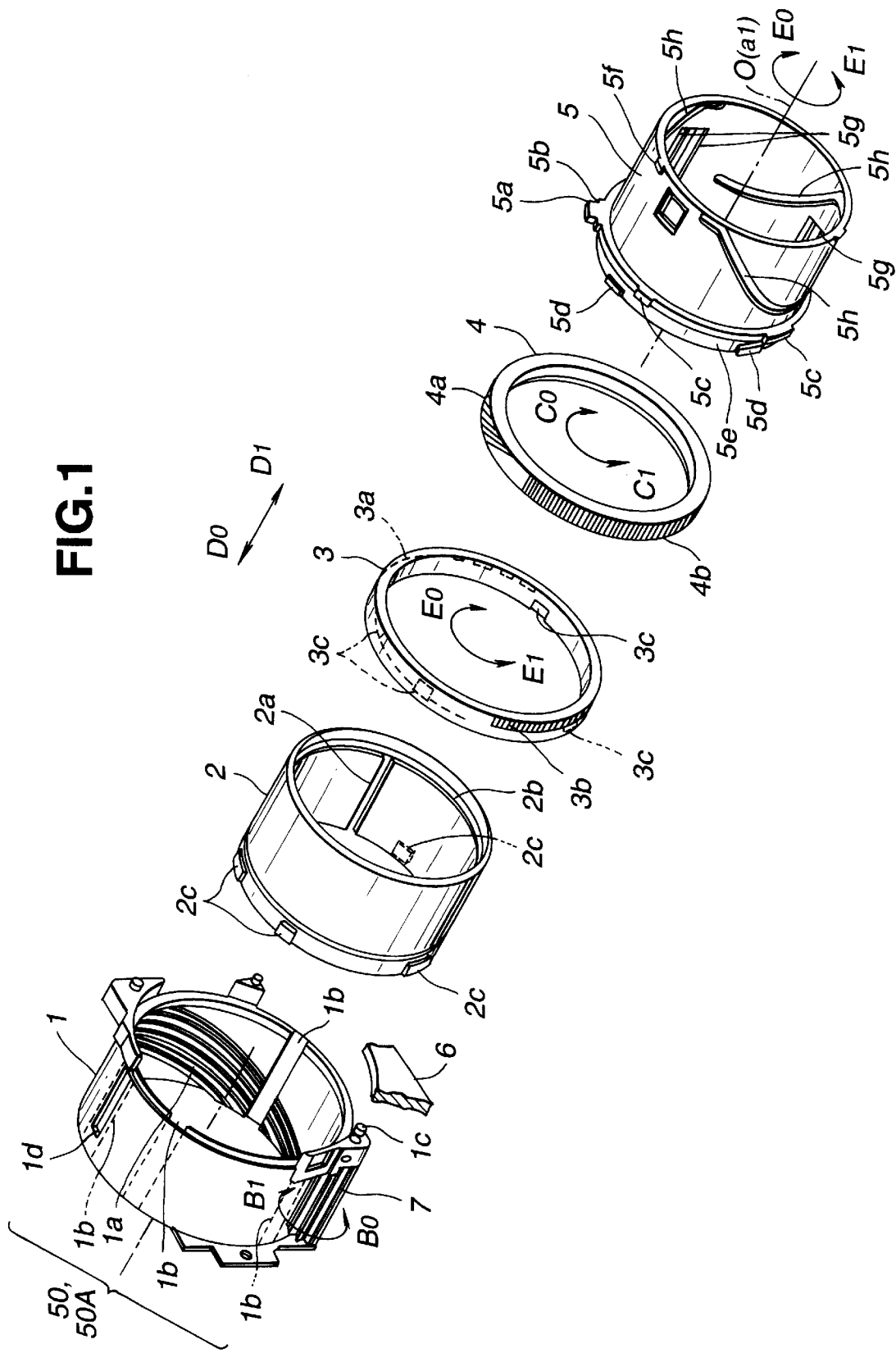
FIG. 1 is an exploded perspective view of a collapsible-barrel drive system for a lens housing of an embodiment according to the present invention.
Figure 2:
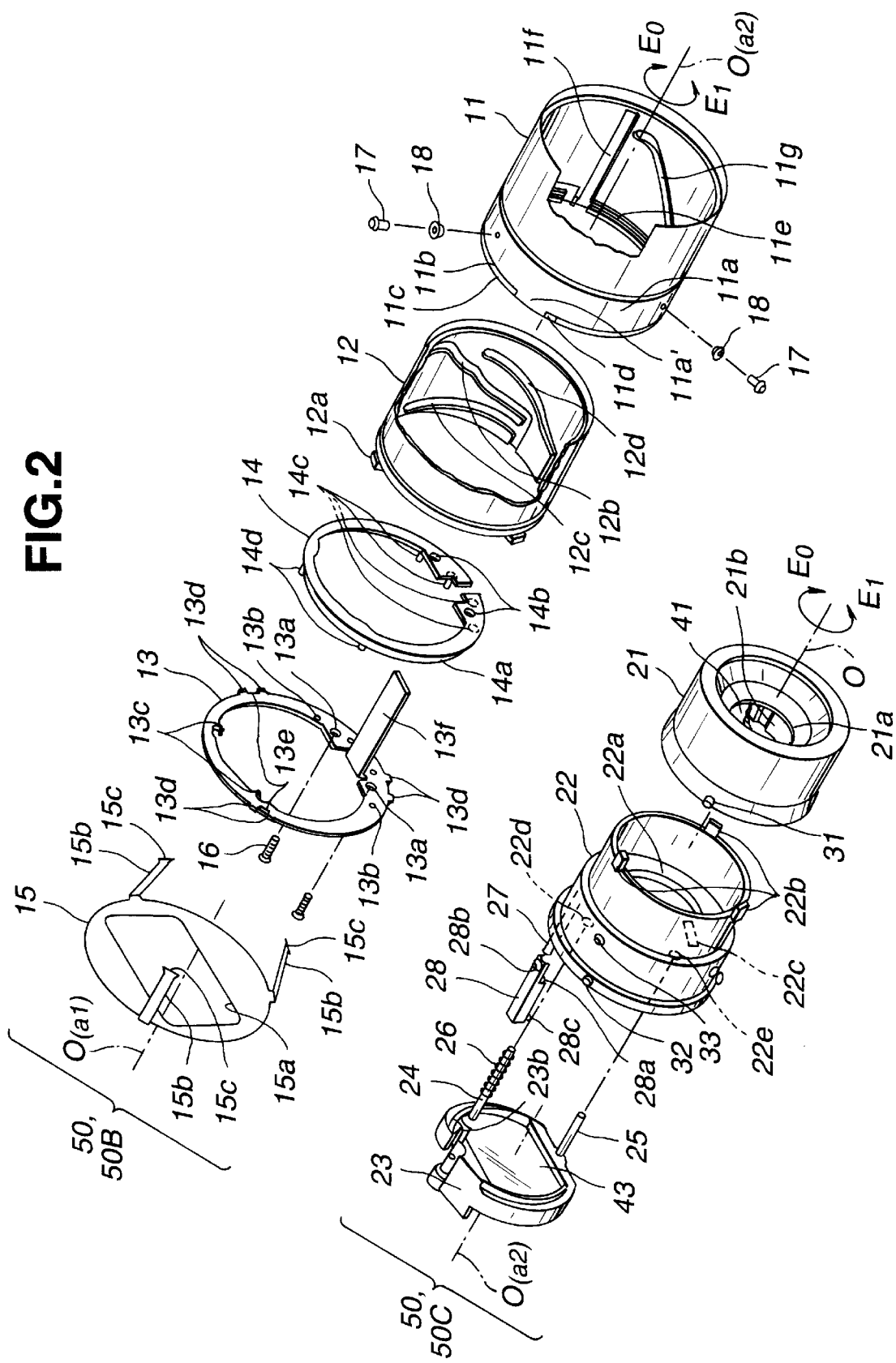
FIG. 2 is an exploded perspective view showing lens-group drive systems and lens-group frame sections of the lens housing of an embodiment of the invention.
Figure 3:
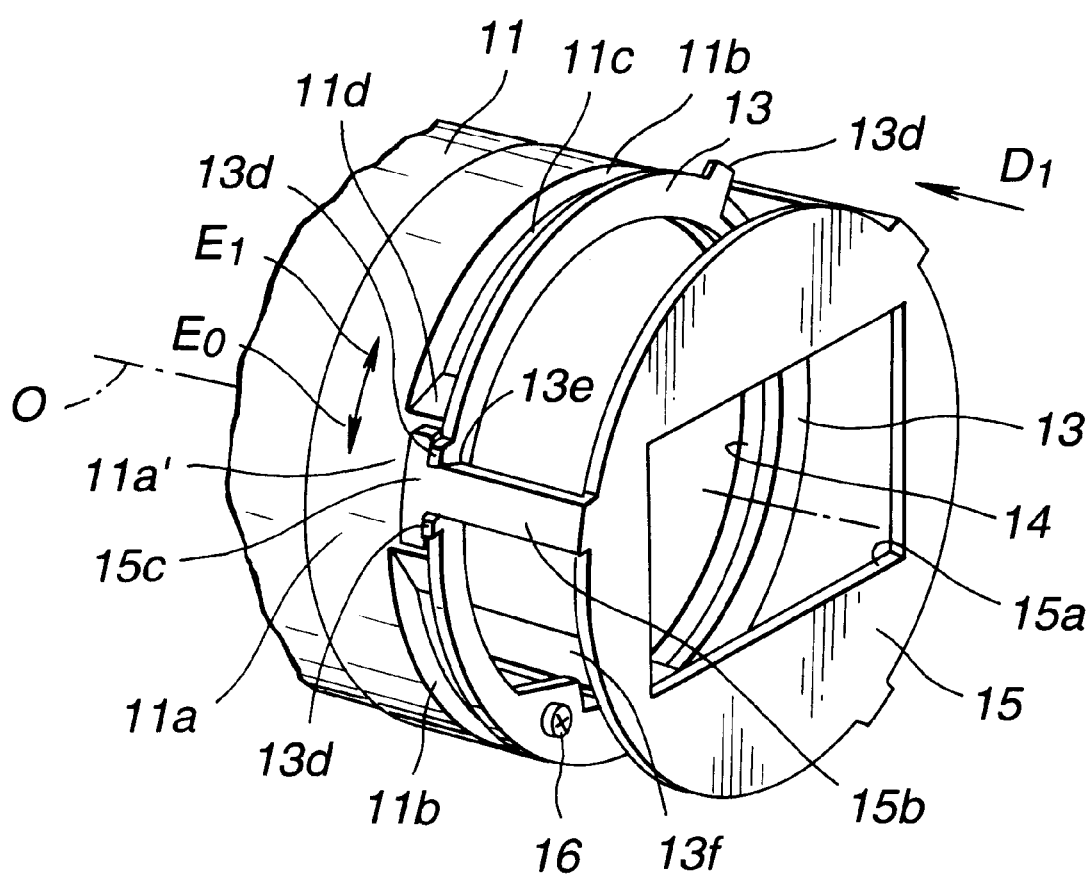
FIG. 3 is a partial perspective view of a movable flare aperture of the lens housing according to an embodiment of the invention.
Figure 4:
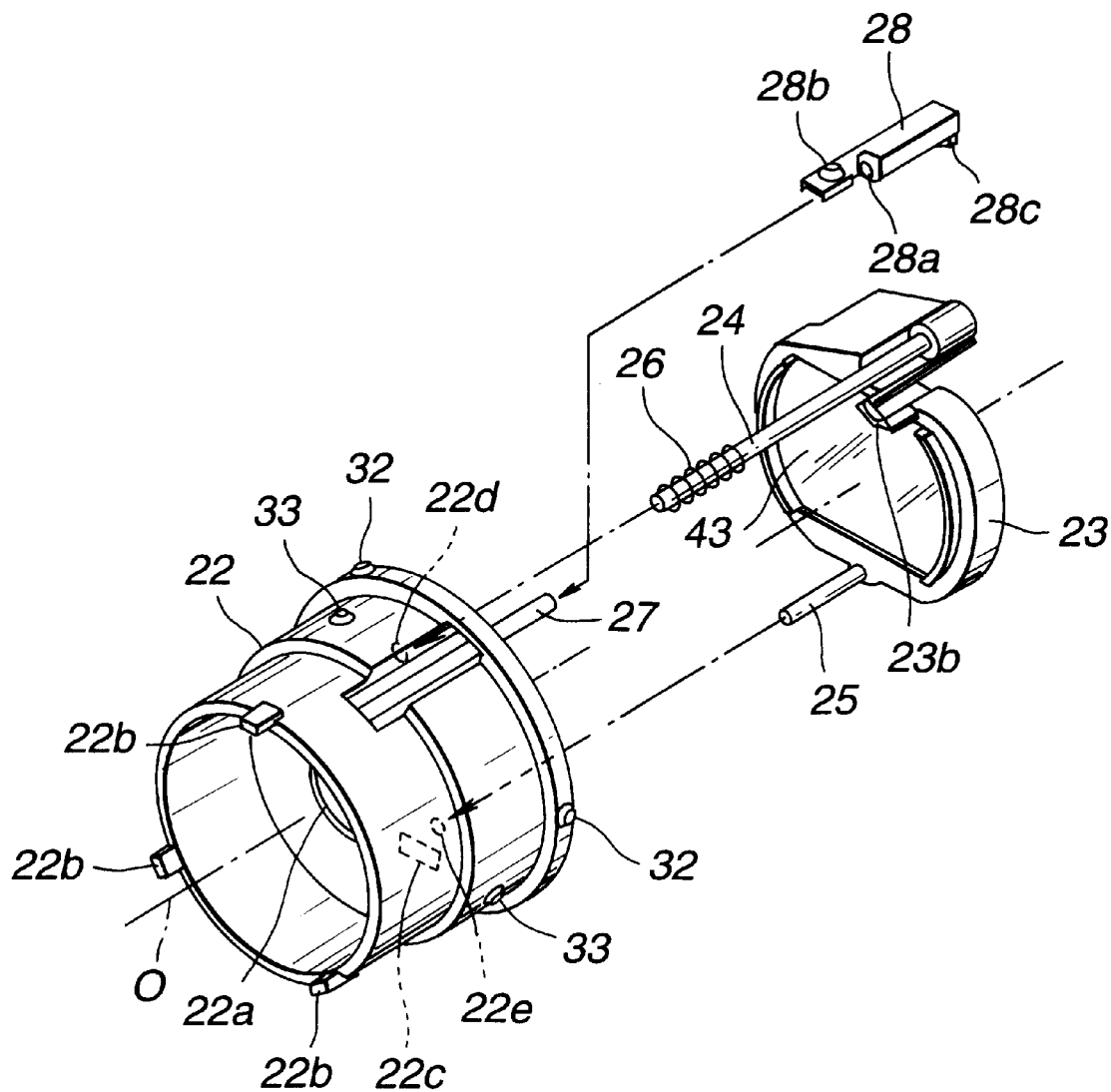
FIG. 4 is an exploded perspective view of group-2 frames and group-3 frames of the lens housing according to an embodiment of the invention.
Figure 5:
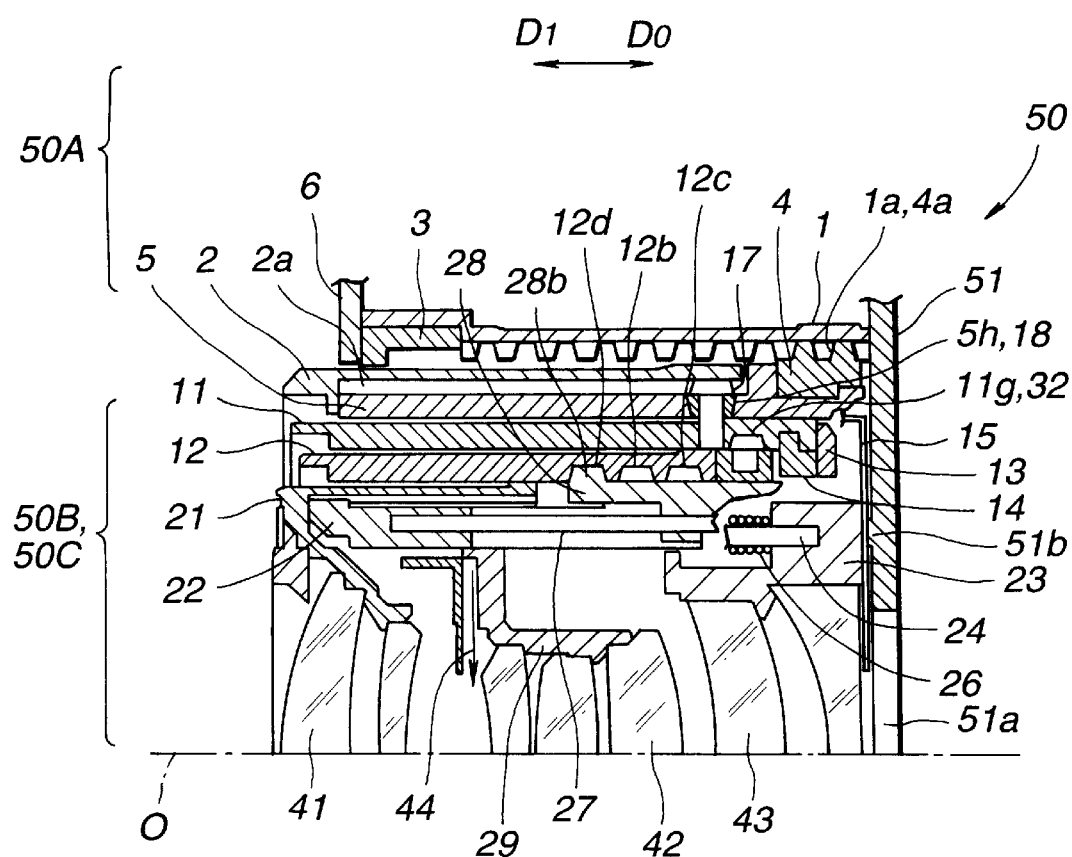
FIG. 5 is a vertical cross-sectional view showing a collapsed-barrel state of the lens housing according to an embodiment of the invention.
Figure 6:
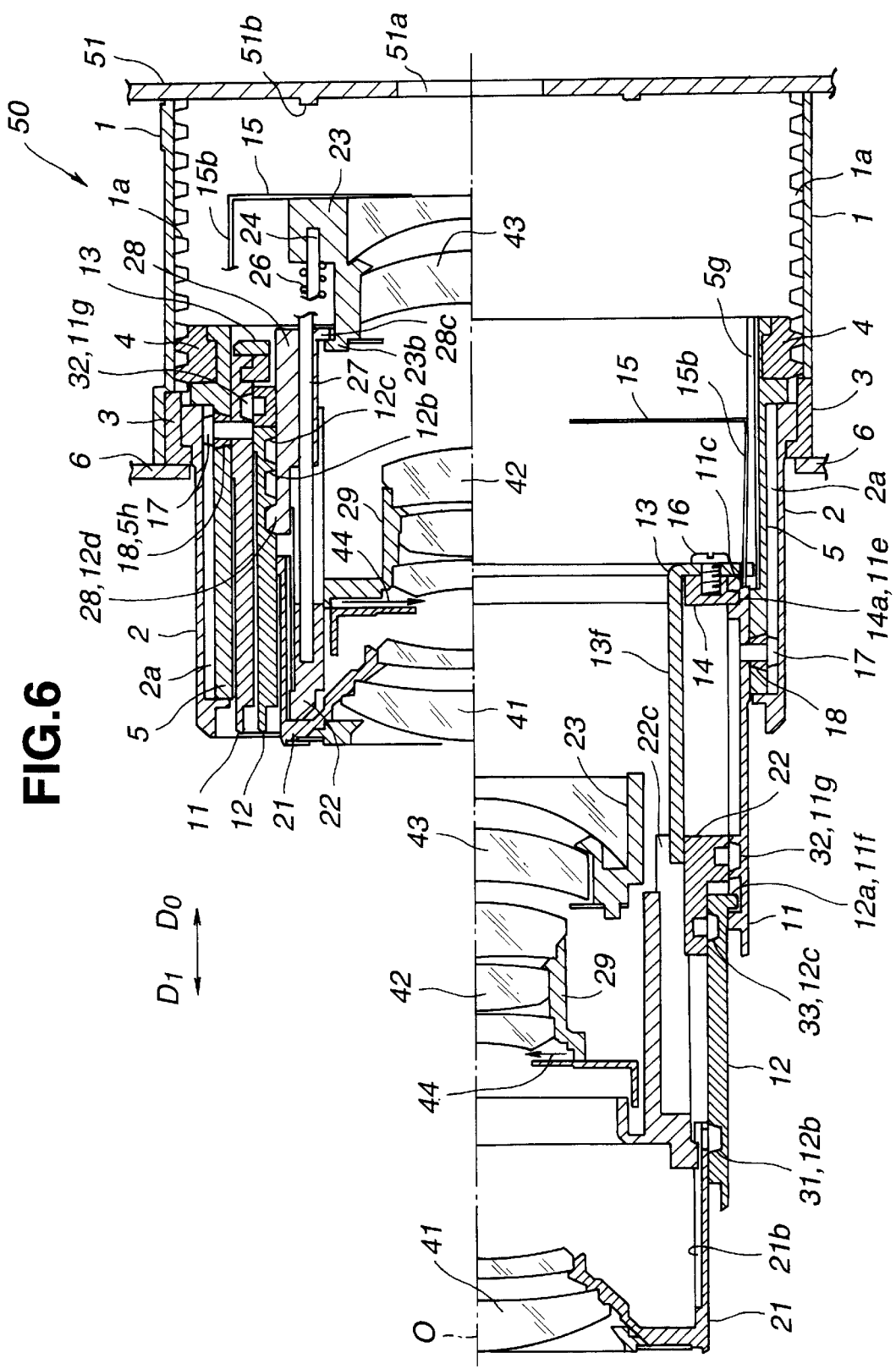
FIG. 6 is a vertical cross-sectional view of the lens housing of an embodiment of the invention, in which the upper half shows an image-capturing preparation state and a wide-angle state, and the lower half shows a telescopic state.
Figure 7:
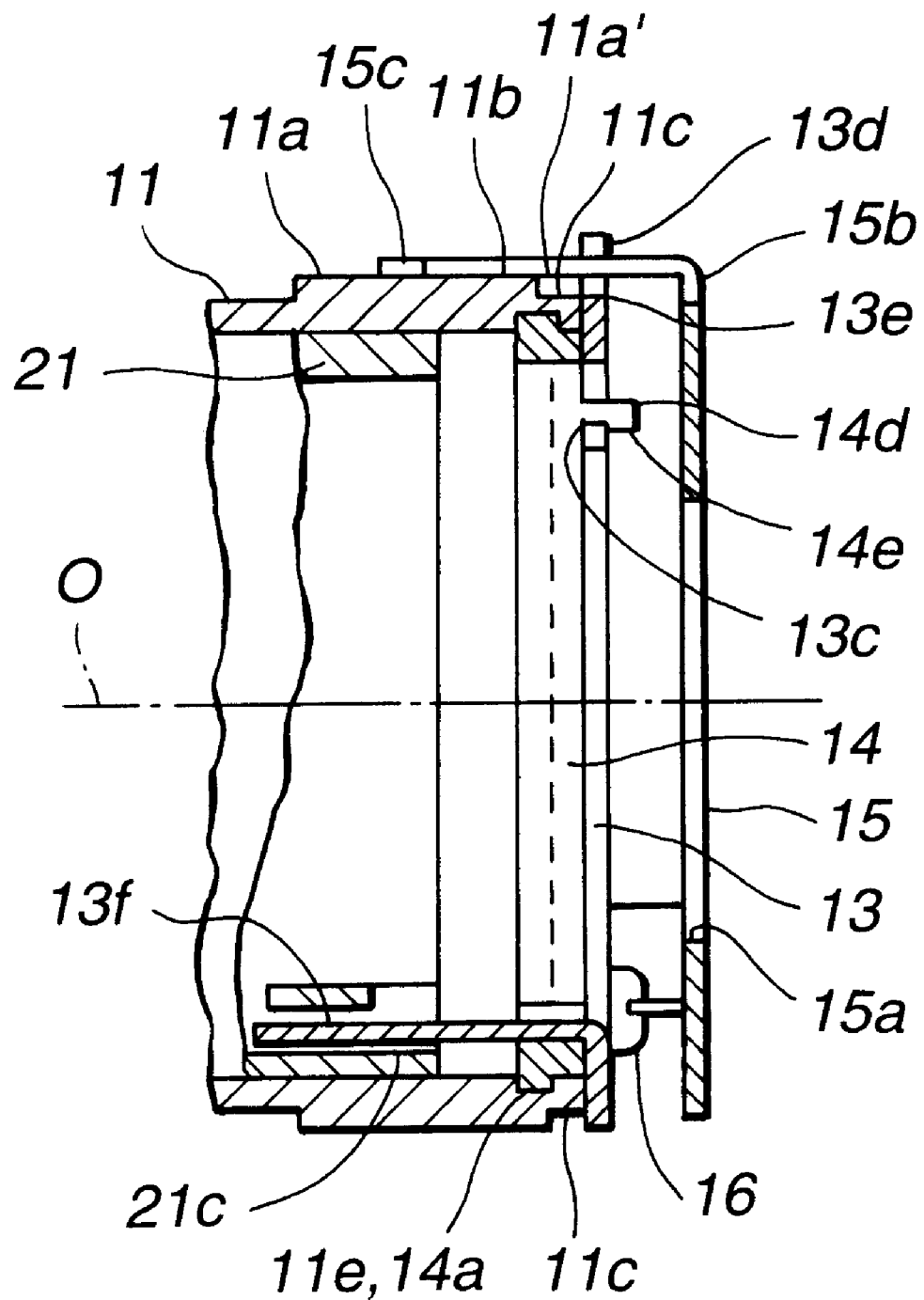
FIG. 7 is a partial vertical cross-sectional view of a movable flare aperture of the lens housing according to an embodiment of the invention.

FIGS. 1 and 2 are exploded perspective views of an embodiment of a lens housing 50 according to the present invention. FIG. 3 is a partial perspective view of the lens housing including a movable flare aperture. FIG. 4 is an exploded perspective view of group-2 and group-3 frames. FIGS. 5 and 6 are vertical cross-sectional views of the lens housing 50 in different states, FIG. 5 showing a view of a collapsed-barrel state and FIG. 6 showing an image-capturing preparation state or a wide-angle state in the upper half portion, and a telescopic state in the lower half. FIG. 7 is a partial vertical cross-sectional view of a movable flare aperture. Referring back to FIGS. 1 and 2, the individual components are not shown in an assembled orientation to make the configurations thereof readily apparent.

The lens housing 50 has a collapsible-barrel drive system 50A, a lens-group drive system 50B, and a lens-group frame section 50C. The collapsible-barrel drive system 50A in FIG. 1 is for extending/retracting the lens housing 50 between a collapsed-barrel position and an image-capturing preparation position, within a collapsible-barrel drive region. The lens-group drive system 50B is for extending the individual lens-group frames shown in FIG. 2.

As shown in FIG. 1, the collapsible-barrel drive system 50A has an immobilized frame 1, a rotationally20 driven frame 2, a helicoid ring 4, and a moving frame 5. The immobilized frame 1 is immobilized and supported mainly by a camera body (not shown) and has a helicoid-ring drive gear 7 and a drive ring 3. The rotationally-driven frame 2 is a lens frame that extends and retracts between the collapsed-barrel position and the image-capturing preparation position, and rotates between a wide-angle position and a telescopic position at the image-capturing preparation position. The helicoid ring 4 is rotatably and movably supported by the moving frame 5 described below. The moving frame 5 is a lens frame that moves linearly with the rotationally-driven frame 2 between the collapsed-barrel position and an image-capturing preparation position.

The individual members of the collapsible-barrel drive system 50A are described below in more detail. The immobilized frame 1 is immobilized and supported by a camera body 51(FIG. 5). It has a linearly-guiding groove 1d, for receiving a tab of the moving frame 5, extending through an exterior peripheral section thereof. It also has a female helicoid thread 1a and linearly-guiding grooves 1b in an interior peripheral section thereof. The drive ring 3 is rotatably moved and driven in a drive-ring-supporting section 1c, a thrust-direction position of the drive ring 3 being defined by a stopper plate 6. The helicoid-ring drive gear 7 extends along an axial direction and is rotatably supported by an exterior peripheral section of the immobilized frame 1. A toothed section of the helicoid-ring drive gear 7 is exposed to the interior peripheral section of the immobilized frame 1.

The linearly-guiding grooves 1b and other linearly-guiding grooves described below are parallel to an optical axis O of an image-capturing optical system.

The aforementioned drive ring 3 has a zoom gear 3a and a viewfinder gear 3b in an exterior peripheral section thereof, and has groove-like indented sections 3c in an interior peripheral section thereof. The zoom gear 3a drivingly engages with a zoom drive system (not shown). The viewfinder gear 3b driving by engages with a viewfinder drive system (not shown).

The aforementioned rotationally-driven frame 2 has a linearly-guiding groove 2a in an interior peripheral section thereof, an interior peripheral groove 2b in a front-end section of the interior peripheral section (on the side of a subject), and projections 2c on an exterior peripheral section thereof. The aforementioned helicoid ring 4 has a male helicoid thread 4a and a drive gear 4b on an exterior peripheral section thereof.

The aforementioned moving frame 5 has an electronic-flash drive projection 5a, linearly-guiding-groove projections 5b and 5c, projections 5d, and a peripheral guide 5e defined by the peripheral face between the projections 5d and a ring-like rib connecting the projections 5c and the projection 5b. The moving frame 5 also has a projection 5f at the end thereof, and three linearly-guiding grooves 5g in an interior peripheral section thereof. The moving frame 5 has cam grooves 5h, each being oblique to the optical axis and extending through the interior and exterior peripheral sections thereof.

In the collapsible-barrel drive system 50A constructed from the members described above, the helicoid ring 4 is rotatably supported by the moving frame 5 and axially fixed thereby. The lens-group drive system 50B and the lens-group frame section 50C, described below, are assembled so as be rotatable, extendable, and retractable. The moving frame 5 is received in the interior peripheral section of the rotationally-driven frame 2. In this state, since the projection 5f engages with the interior peripheral groove 2b, the moving frame 5 is rotatably and movably supported such that the position thereof in the axial-direction is controlled in relation to the rotationally-driven frame 2.

The rotationally-driven frame 2 and the moving frame 5 are individually inserted into the immobilized frame 1, rotationally fixed relative thereto, when the projections 2c, 5c, and 5b are received in the linearly-guiding grooves 1b and 1d. Once assembled, the male helicoid thread 4a of the helicoid ring 4 is engaged with the female helicoid thread 1a of the immobilized frame 1 and the drive gear 4b is engaged with the helicoid-ring drive gear 7.

When the rotationally-driven frame 2 and moving frame 5 are received in the immobilized frame 1, and when the moving frame 5 and the rotationally-driven frame 2 are in the collapsed-barrel position on the side of a film surface (FIG. 5), when the helicoid-ring drive gear 7 is rotated in a clockwise (as viewed from the subject side) direction B1, the helicoid ring 4 rotates in a counterclockwise direction C1. This rotational movement causes the moving frame 5 and the rotationally-driven frame 2 to extend in a direction D1 (toward the subject) to the image-capturing preparation position (upper half of FIG. 6).

When the moving frame 5 and the rotationally-driven frame 2 have reached the image-capturing preparation position, the rotationally-driven frame 2 disengages from the linearly-guiding grooves 1b of the immobilized frame 1, and is received in the side of the indented sections 3c of the drive ring 3. In this state, when the drive ring 3 is rotated in direction EO by means of the zoom drive system, the rotationally-driven frame 2 rotates slightly in the same direction from the image-capturing preparation position and reaches the wide-angle position, which is an image-capturing position. When the rotationally-driven frame 2 rotates further in the same direction described above, it is zoom-driven to the telescopic position. When the drive ring 3 is rotated in the reverse direction E1, the rotationally-driven frame 2 rotates from the zoomed position to the image-capturing preparation position. When the helicoid-ring drive gear 7 is rotated further in the reverse direction BO, the rotationally-driven frame 2 and the moving frame 5 can be retracted to the collapsed-barrel position.

Hereinbelow, a description will be given of the lens-group drive system 5OB.

As shown in FIGS. 2, 3, 4, and 7, the lens-group drive system 50B has an M-cam frame 11, an F-cam frame 12, a key ring 13, and a movable flare aperture 15. The M-cam frame 11 is received in the moving frame 5 and driven forward or backward. The F-cam frame 12 is a cam-driving mechanism and a rotationally-driven frame that rotates with the M-cam frame 11, and extends and retracts via a group-2 frame 22. The key ring 13 includes a key stopper 14 and guides the lens-group frame linearly. The movable flare aperture 15 moves linearly and is supported by the M-cam frame 11.

Hereinbelow, the individual members of the lens-group drive system 50B are described in more detail.

The M-cam frame 11 is extendibly and retractably received in the interior peripheral section of the aforementioned moving frame 5. On an exterior peripheral section thereof, the M-cam frame 11 has an exterior peripheral surface 11a, three cam followers 17, three cam followers 18, a stepped side face 11b, a stepped peripheral face 11c, an end exterior peripheral surface 11a', and a peripherally sloped face 11d. The exterior peripheral surface 11a is a second slide face on which end protrusions 15c of the movable flare aperture slide. The cam followers 17 frictionally engage the M-cam frame 11 along individual axes. The cam followers 18 rotatably receive the cam followers 17. The peripherally sloped face 11d is peripherally adjacent to the exterior peripheral surface 11a'. On an interior peripheral section, the M-cam frame 11 has an interior peripheral groove 11e in an end section on the film side, three linearly-guiding grooves 11f, and three group-2 cam grooves 11g that are oblique to the optical axis O.

The stepped peripheral face 11c described above is formed in an end section on the film side with one step indented down from the exterior peripheral surface 11a. The stepped peripheral face 11c is a first slide face on which the end protrusion 15c of the arm section 15b of the movable flare aperture 15 slides. The width of the stepped peripheral face 11c in the axial direction is slightly larger than the axial width of the end protrusion 15c so that the end protrusion 15c can slide peripherally.

The exterior peripheral surface 11a' has the same diameter as the exterior peripheral surface 11a, which is the second slide face on which the end protrusion 15c of the movable flare aperture 15 slides.

The peripherally sloped face 11d is a sloped face in the peripheral direction and links the stepped peripheral face 11c and the exterior peripheral surface 11a' (FIG. 3). The stepped side face 11b is a side face perpendicular to the axis between the exterior peripheral surface 11a and the stepped peripheral face 11c (FIG. 3).

The F-cam frame 12 is extendably and retractably received in an interior peripheral section. The F-cam frame 12 has three protrusions 12a on an exterior peripheral section thereof. On an interior peripheral section thereof, the F-cam frame 12 has three group-1 cam grooves 12b, three group-2 cam grooves 12c, and one group-3 cam groove 12d, which are oblique to the optical axis O.

The movable flare aperture 15 is a very thin planer member. It has an opening 15a, which is a flare-aperture opening, formed in a central portion thereof, and three arm sections 15b. Each of the three arm sections 15b is elastically deformable and protrudes and inclines slightly from a direction parallel to the optical axis O in a pre-installation state. The arm sections 15b have peripherally extending end protrusions 15c. In the assembled state, the end protrusions 15c elastically deform and are urged to contact the exterior peripheral surface 11a or the stepped peripheral face 11c of the M-cam frame 11.

The aforementioned key ring 13 is a planar member for guiding the individual lens-group frames linearly. It has screw holes 13a, positioning holes 13b, three double-pronged protrusions 13d, grooves 13e between the individual double-pronged protrusions 13d, two cutouts 13c, and a linearly-guiding key 13f extending in a direction corresponding to the optical axis O.

The width of the groove 13e allows the three arm sections 15b of the movable flare aperture to be inserted. The width is peripherally smaller than the width of the end protrusion 15c. The diameter of the bottom face of the groove 13e is the same as or smaller than the diameter of the stepped peripheral face 11c of the M-cam frame 11 (FIGS. 3 and 7).

The key stopper 14 is elastically deformable having a circular cut out. The key stopper 14 has a peripheral ring 14a, two screw holes 14b, positioning pins 14c at both sides of each of the screw holes 14b, and two stopper pins 14d. The positioning pins 14c can be received by the corresponding positioning holes 13b. Each of the stopper pins 14d has an engaging tab 14e (FIG. 7).

In the lens-group drive system 50B constructed from the above members, the F-cam frame 12 is slidingly received in the M-cam frame 11. When the protrusions 12a are engaged with the linearly-guiding grooves 11f in the interior peripheral section thereof. The individual lens-group frames, described below, are extendibly and retractably received in interior peripheral sections of the M-cam frame 11 and the F-cam frame 12.

The M-cam frame 11, in which the lens-group frames and the like are installed, then is rotatably and movably inserted into the interior peripheral section of the moving frame 5 of the collapsible-barrel drive system 50A. Then, the cam followers 18 of the M-cam frame 11 are slidably engaged with cam grooves 5h. The cam followers 17, which define axes for the cam followers 18, are inserted into the moving frame 5 and slidably engaged with the linearly-guiding grooves 2a of the rotationally-driven frame 2. Corresponding to the rotational movement of the rotationally-driven frame 2, the M-cam frame 11 is rotated and moved, then may be driven forwardly and backwardly in a direction corresponding with the optical axis, by the cam grooves 5h of the moving frame 5.

When the key stopper 14 is expanded in the radial direction, the ring 14a is received in the interior peripheral groove 11e of the M-cam frame 11. The key ring 13 is positioned relative to the key stopper 14 according to the positioning pins 14c and the positioning holes 13b, then fixed by screws 16. Accordingly, the key ring 13 is rotatably and movably supported while the position in the axial-direction is controlled on the film-side in relation to the M-cam frame 11.

When the key ring 13 is assembled with the key stopper 14, as shown in FIG. 7, the stopper pins 14d of the key stopper 14 are engaged with the cutouts 13c of the key ring 13. The engaging tab 14e of the stopper pins 14d is also engaged therewith to eliminate a gap between the key stopper 14 and the key ring 13.

The double-pronged protrusions 13d are slidably engaged with the linearly-guiding grooves 5g. Therefore, the key ring 13 does not rotate and is driven linearly. In addition, since the linearly-guiding key 13f of the key ring 13 slidably engaged with a linearly-guiding hole 22c of a group-2 lens frame 22, described below, the group-2 lens frame 22, a group-1 lens frame 21 supported by the group-2 lens frame 22, and a group-3 lens frame 23 are guided linearly.

The movable flare aperture 15 is installed so that the three arm sections 15b pass through the grooves 13e of the key ring 13 from the film side, the end protrusions 15c are slidably received on the exterior peripheral surface 11a of the M-cam frame 11 or the stepped peripheral face 11c of the M-cam frame 11.

Hereinbelow, the aforementioned lens-group frame section 50C is described.

The movable flare aperture 15 is slidably received, when the three arm sections 15b pass through the grooves 13e of the key ring 13 from the film side, the end protrusions 15c are fitted to the exterior peripheral surface 11a of the M-cam frame 11 or the stepped peripheral face 11c of the M-cam frame 11.

Hereinbelow, the aforementioned lens-group frame section 50C is described.

The lens-group frame section 50C has the group-1 lens frame 21, the group-2 lens frame 22, a movable follower 28, the group-3 lens frame 23, and a focusing frame 29. The group-1 lens frame 21 is installed in the M-cam frame 11 and the F-cam frame 12 and has lens-group-supporting frames that move linearly, is driven forwardly and backwardly, and has a group-1 lens 41. The group-2 lens frame 22 is guided linearly via the key ring 13 and is driven forwardly and backwardly by the M-cam frame 11. The movable follower 28 is driven forwardly and backwardly via the F-cam frame 12. The group-3 lens frame 23 is driven forwardly and backwardly via the movable follower 28 and supports a group-3 lens 43. The focusing frame 29 is supported by the group-2 lens frame 22, is driven linearly by a focusing-drive system (not shown), and supports a group-2 lens 42.

The group-2 lens frame 22 has three cam followers 32 and three cam followers 33 in an exterior peripheral section thereof, and three protrusions 22b in an end section thereof. In an interior peripheral section thereof, the group-2 lens frame 22 has a linearly-guiding hole 22c, an axis hole 22d, a cutout 22e, a guiding axis 27, and an opening 22a (FIG. 4). The linearly-guiding hole 22c receives the linearly-guiding key 13f. The axis hole 22d extends in a direction corresponding to the optical axis O. The guiding axis 27 is stationary and supported in a direction corresponding to the optical axis O. The opening 22a is for installation of a shutter 44.

The group-1 lens frame 21 has an opening 21a supporting the group-1 lens 41, three cam followers 31 in an exterior peripheral section thereof, and linearly-guiding grooves 21b in an interior peripheral section thereof.

The movable follower 28 controls the extending/retracting position of the group-3 lens frame 23. It has an axis hole 28a, a cam follower 28b, and an engaging tab 28c. The axis hole 28a slidably receives the guiding axis 27 of the group-2 lens frame 22. The engaging tab 28c engagingly stops the group-3 lens frame 23.

The group-3 lens frame 23 is linearly slidably supported by the group-2 lens frame 22. It has stationary guiding axes 24 and 25, an engaging section 23b corresponding to the engaging tab 28c, and an opening that supports the group-3 lens 43.

The focusing frame 29 supports the group-2 lens 42 and is supported by the group-2 lens frame 22 so that it can move forwardly and backwardly. The focusing frame 29 is driven forwardly and backwardly by a focusing-drive system (not shown)(FIGS. 5 and 6).

In the lens-group frame section 50C described above, the protrusions 22b on the exterior peripheral section on the subject side are slidably engaged with the linearly-guiding grooves 21b of the group-1 lens frame 21 then the group-1 lens frame 21 is assembled with the group-2 lens frame 22. The group-3 lens frame 23 is assembled with the group-1 lens frame-group-2 lens frame assembly such that the guiding axes 24 and 25 are slidably received in the axis hole 22d and the cutout 22e, respectively. A pushing spring 26, an urging means, is received by the guide axis 24, biasing in the direction of the film against the group-3 lens frame 23.

The guiding axis 27 is slidably received in the axis hole 28a, then the movable follower 28 is assembled with the group-2 lens frame 22. When an abutting force of the camera body 51 is not exerted on the group-3 lens frame 23, the engaging tab 28c of the movable follower 28 engages with the engaging section 23b of the group-3 lens frame 23, thereby defining the position of the group-3 lens frame 23.

The lens-group frame section 50C is installed in the M-cam frame 11 and the F-cam frame 12 of the lens-group drive system 50B so that it can move linearly forwardly and backwardly. The linearly-guiding key 13f of the key ring 13 is guided linearly and slidably passes through the linearly-guiding hole 22c of the group-2 lens frame 22, thereby supporting the group-1 and group-3 lens frames 21 and 23 and the movable follower 28 with the group-2 lens frame 22 so that they can move linearly forwardly and backwardly.

The cam followers 31 of the group-1 lens frame 21 are engaged with the corresponding group-1 cam grooves 12b of the F-cam frame. [Also, the] The cam followers 32 and 33 of the group-2 lens frame 22 are engaged with the corresponding group-2 cam grooves 11g of the M-cam frame. The movable cam follower 28b is engaged with the group-3 cam groove 12d of the F-cam frame.

In view of the above, extending/retracting positions of members such as the individual frames are defined as described below with respect to the M-cam frame 11. The position of the F-cam frame 12 is defined by the group-2 lens frame 22 and the group-2 cam grooves of the F-cam frame 12. The position of the group-3 lens frame 23 is defined via the engaging tab 28c of the movable follower 28.

Hereinbelow, a description will be given of retraction and extension operations of the lens housing 50 configured as above.

When the lens housing 50 is in the collapsed-barrel state, as shown in FIG. 5, all of the members, such as the rotationally-driven frame 2, are held inside the immobilized frame 1, that is, in the collapsed-barrel state. The group-3 lens frame 23 and the movable flare aperture 15 are urged by the pushing spring 26 via a protrusion 51b near an aperture 51a of the camera body 51. As a result, they assume a stowed (collapsed-barrel) position relatively close to the group-2 lens frame 22 and the M-cam frame 11.

In the collapsed state, as shown in FIG. 5, the group-3 lens frame 23 is relatively close to the group-2 lens frame 22, and the movable follower 28 is supported and controlled with the cam frame-F 12. The movable follower 28 and the engaging section 23b are disengaged and parted.

As shown in FIG. 7, the end protrusion 15c of the movable flare aperture 15 has advanced forwardly on the exterior peripheral surface 11a of the M-cam frame 11.

To drive the lens housing 50 from the collapsed-barrel state to the image-capturing preparation state, the helicoid-ring drive gear 7 is rotated in the direction B1, and the helicoid ring 4 is rotated in the direction C1. With the rotation, the rotationally-driven frame 2 and the moving frame 5 are guided by the linearly-guiding grooves 1b and are integrally moved in direction D1, thereby extending the lens housing 50 from the collapsed-barrel position to the image-capturing preparation position(upper half of FIG. 6). The moving frame 5 remains engaged with the linearly-guiding grooves 1d and 1b. However, the projections 2c disengage from the linearly-guiding grooves 1b and engage with the indented sections 3c, and, corresponding to the rotation of drive ring 3, the rotationally-driven frame 2 becomes rotatable.

When the drive ring 3 is rotated further by the zoom drive system slightly from the aforementioned image-capturing preparation state, the lens housing 50 assumes the wide-angle state as shown in the upper half of FIG. 6.

When the lens housing 50 shifts from the collapsed-barrel state to the image-capturing preparation state and the wide-angle state, the group-2 lens frame 22, the rotationally-driven frame 2, and the moving frame 5 integrally extend.

The group-3 lens frame 23 is urged by the pushing spring 26 and [thereby] moves [backward relatively] backwardly from the M-cam frame 11 and the group-2 lens frame 22. Then, the group-3 lens frame 23 moves backwardly from a wide-angle-ready position where the engaging tab 28c of the movable follower 28 engages with the engaging section 23b.

During the aforementioned driving, the movable flare aperture 15 is pushed by the group-3 lens frame 23, thus, similarly to the above, moves back. The end protrusions 15c of the three arm sections 15b slide over the exterior peripheral surface 11a' of the M-cam frame 11 shown in FIG. 3. When the M-cam frame 11 rotates slightly in the direction EO up to the wide-angle position, the end protrusions 15c slide down the peripherally sloped face 11d over the stepped peripheral face 11c. The movable flare aperture 15 thus is located with respect to the M-cam frame 11 so as to provide an intended normal function.

To drive the lens housing 50 from the wide-angle state to a telescopic state, the drive ring 3 is rotated in the direction EO, and the rotationally-driven frame 2 is rotated in the same direction (lower half of FIG. 6). That is, corresponding to the rotational movement in the direction EO, the M-cam frame 11 rotates and extends along the cam grooves 5h of the moving frame 5. The F-cam frame 12 is rotated by the linearly-guiding grooves 11f integrally with the M-cam frame 11. Thus, the extending position is defined via the cam followers 33 of the group-2 lens frame 22, which engage with the cam grooves 12c.

Guided linearly by the key ring 13, the group-2 lens frame 22 is extended by the group-2 cam grooves 11g of the M-cam frame 11 to a telescopic-ready position. The group-1 lens frame 21 is extended to the telescopic-ready position by the group-1 cam grooves 12b of the F-cam frame 12 which engage with the cam followers 31. The position of the movable follower 28 is defined by the group-3 cam groove 12d, and the cam follower 28b of the movable follower 28 engages with the engaging section 23b. Thus, the group-3 lens frame 23 moves to the telescopic-ready position.

While the M-cam frame 11 rotates to extend and retract between the wide-angle state and the telescopic state, the movable flare aperture 15 is supported without being rotated by the grooves 13e of the key ring 13. This ensures that the movable flare aperture 15 is supported in a predetermined position spaced with respect to the M-cam frame 11 for providing an intended normal function.

To drive the lens housing 50 from the wide-angle state to the image-capturing preparation state and the collapsed-barrel position, the drive ring 3 is first rotated in the direction E1, thereby driving the lens housing 50 to the image-capturing preparation state. In this state, the group-1 lens frame 21 and the group-2 lens frame 22 are extended within the moving frame 5. The group-3 lens frame 23 remains located in a position where it may be moved backwardly with respect to the M-cam frame 11 (the upper half of FIG. 6). The end protrusions 15c, or arm sections of the movable flare aperture 15, rotate in the direction E1. Thus, the end protrusions 15c slide on the continuously sloped face 11d to be located over the exterior peripheral surface 11a' (FIG. 3).

Subsequently, the helicoid-ring drive gear 7 is rotated in the direction BO so as to rotate the helicoid ring 4 in the direction CO. Correspondingly, the moving frame 5 and the rotationally-driven frame 2 integrally move back in a direction DO, and the projections 2c of the rotationally-driven frame 2 are disengaged from the drive ring 3. When the helicoid ring 4 is further rotated, the rotationally-driven frame 2 moves integrally with the moving frame 5 in the direction DO and is retracted to the collapsed-barrel position so as to be housed within the immobilized frame 1 (FIG. 5).

Corresponding to the above collapsed-barrel operation, the group-3 lens frame 23 and the movable flare aperture 15 are pushed by the protrusion 51b of the camera body 51, overcome the urging force of the pushing spring 26, and move forwardly. As a result, the group-3 lens frame 23 disengages from the movable follower 28, as described above, and is moved to the stowed (collapsed-barrel) position in the group-2 lens frame 22 (FIG. 5). The movable flare aperture 15 also moves forwardly relative to the M-cam frame 11 in a direction corresponding to the optical axis, and the end protrusions 15c slide forward on the exterior peripheral surface 11a from the exterior peripheral surface 11a' of the M-cam frame 11 so as to be in a stowed state (FIG. 5).

In this embodiment, the guiding axis 27 supporting the movable follower 28 is provided in the group-2 lens frame 22, but it may be provided in the group-3 lens frame.

As described above, according to the lens housing 50, in the image-capturing preparation state and the wide-angle state, the group-3 lens frame 23 (first frame member) supported by the guide axes 24 and 25 relative to the group-2 lens frame 22 (second frame member) receives the urging force from the pushing spring 26 (urging means). Then, the group-2 lens frame 22 and the group-3 lens frame 23 are engaged with the movable follower 28 (cam-follower member) which is independently, slidably supported by the guiding axis 27. Subsequently, the movable follower 28 is driven along the group-3 cam groove 12d of the cam frame-F 12 (a driving means and a rotating-frame member) and is thereby set to individual image-capturing positions.

To effect the stowed state (collapsible-barrel state), the protrusion 51b of the camera body (not shown) pushes the group-3 lens frame 23 against the pushing spring 26. This disengages and moves the group-3 lens frame 23 close to the group-2 lens frame 22 to drive it into the stowed position (collapsible-barrel position).

According to the above, there is no case when smooth operations cannot be performed due to the deformation of the coupling member as in the conventional case. Therefore, the group-3 lens frame 23 can be driven to the collapsed-barrel position and the image-capturing position with high precision without the coupling member being unnecessarily reinforced. Also, the present invention provides for miniaturization of the lens housing. Furthermore, unlike in the conventional lens housing, no extra space is required since the movable frame corresponding to the group-3 lens frame is driven so as to be stowed. Still furthermore, the present invention reduces restrictions for the shape of the group-3 lens frame.

What is claimed is:

1. A lens housing comprising:
   a plurality of frame members movable in a direction corresponding to an optical axis;
   a separate cam-follower member slidably supported on one of the plurality of frame members in the direction opposing, engaged with and spaced from the other of the frame members; and
   driving means for driving the cam-follower member.

2. A lens housing as claimed in claim 1, wherein the driving means is rotatably and movably supported and comprises a cam frame including a cam; and the cam-follower member which is engaged with the other of the frame members comprises a cam follower for engaging with the cam of the cam frame.

3. A lens housing as claimed in claim 2, wherein the cam-follower member is smaller than the frame members.

4. A lens housing as claimed in claim 1, wherein the frame members move between image-capturing regions during image-capturing and a stowed position set back farther than the image-capturing regions; and the cam-follower member, in the stowed position, opposes and is spaced from the other of the frame members, and, in the image-capturing regions, is engaged with the other of the frame members.

5. A lens housing comprising:
   a first frame member;
   a second frame member movable in a direction corresponding with the optical axis for linearly, but non-rotatably supporting the first frame member;
   urging means for urging the first frame member so as to oppose and be spaced from the second frame member in a direction corresponding to the optical axis;
   a cam-follower member, movably supported in a direction corresponding to the optical axis in relation to the first frame member and the second frame member, adapted for engaging with the first frame member urged by the urging means, whereby a position in a direction corresponding to an optical axis is varied, and comprising cam follower for driving the cam-follower member in a direction corresponding to the optical axis; and
   cam-driving means for engaging with the cam-follower member to drive the cam-follower member in a direction corresponding to the optical axis.

6. A lens housing as claimed in claim 5, wherein the cam-follower member is driven by the cam-driving means to a position where the cam-follower member opposes and is spaced relative to the first frame member and to a position where the cam-follower member engages with the first frame member.

7. A lens housing as claimed in claim 6, further comprising a control member provided in a predetermined position in a trail in which the first frame member moves and is urged by the urging means to stop at the predetermined position when the first frame member abuts the control member and during movement in a direction corresponding to the optical axis; and, during the movement of the cam-follower member in the direction corresponding to the optical axis, the cam-follower member and the first frame member integrally move when the cam-follower member and the first frame member are engaged, and the cam-follower member opposes and is spaced from the first frame member when the first frame member is controlled by the control member.

8. A lens housing as claimed in claim 5, wherein the cam-follower member has a long member protruding in a direction corresponding to the optical axis, proximate to one end thereof, and the cam-follower member is proximate to the other end thereof.

9. A lens housing as claimed in claim 5, wherein the cam-follower member is arranged partially around while the first frame member and the second frame member are formed substantially entirely around the periphery about the optical axis.

10. A lens housing as claimed in claim 5, wherein the cam-follower member is slidably guided and fitted to one of the first frame member and the second frame member in a direction corresponding to the optical axis.

11. A lens housing as claimed in claim 7, wherein the first frame member is movable in a direction corresponding to the optical axis between image-capturing regions, during image-capturing, and a stowed position. set back farther than the image-capturing regions; and the cam-follower member in the stowed position, opposes and is spaced from the first frame member, and, in the image-capturing regions, engages with the first frame member.

12. A lens housing as claimed in claim 7, wherein the cam-follower member has a long member protruding in a direction corresponding to the optical axis, proximate to one end thereof, and the cam-follower member is proximate to the other end thereof.

13. A lens housing as claimed in claim 7, wherein the cam-follower member is arranged partially around while the first frame member and the second frame member are formed substantially entirely around the periphery about the optical axis.

14. A lens housing as claimed in claim 7, wherein the cam-follower member is slidably guided and fitted to one of the first frame member and the second frame member in a direction corresponding to the optical axis.

15. A lens housing comprising:
    a rotationally-driven rotating-frame member, including a cam, provided rotatably and movably in relation to an immobilized frame;
    a first frame member movable in the rotating frame in a direction corresponding to an optical axis in relation to the rotating frame;
    a second frame member linearly movable in the rotating frame in a direction corresponding to the optical axis in relation to the immobilized frame for supporting the first frame member that is linearly movable along the optical axis without rotational movement; and
    a cam-follower member, supported movably in the direction corresponding to the optical axis with respect to the first frame member and the second frame member, being engageable with and movable from the first frame member for integrally varying a position of the first frame member along the direction and having a cam follower for engaging with a cam of the rotating frame, whereby a rotational driving force of the rotating frame can be transmitted to the first frame member.

16. A lens housing as claimed in claim 15, wherein the cam-follower member is slidably guided and fitted to one of the first frame member and the second frame member in a direction corresponding to the optical axis.

17. A lens housing as claimed in claim 15, further comprising:
    a guiding axis provided along a direction corresponding to the optical axis by one of the first frame member and the second frame member; and
    a guiding hole in the cam-follower member so as to slidably receive the guiding axis.

18. A lens housing as claimed in claim 15, wherein the cam-follower member has a long member protruding in a direction corresponding to the optical axis, proximate to one end thereof and the cam-follower is proximate to the other end thereof; and a guiding section slidably guided in a direction corresponding to the optical axis with respect to one of the first frame member and the second frame member.

19. A lens housing as claimed in claims 15, wherein the cam-follower member is arranged partially around while the lens housing is formed substantially entirely around the periphery about the optical axis.

20. A lens housing as claimed in claim 15, further comprising:
    urging means for urging the first frame member away from the second frame member in a direction corresponding to the optical axis; and
    control means in a predetermined position in a trail in which the first frame member moves and is urged by the urging means to stop at the predetermined position when the first frame member abuts the control member during movement in a direction corresponding to the optical axis; and, during the movement of the cam-follower member in the direction corresponding to optical axis, the cam-follower member and the first frame member integrally move when the cam-follower member and the first frame member are engaged, and the cam-follower member opposes and is spaced from the first frame member when the first frame member is controlled by the control member.

21. A lens housing as claimed in claim 20, wherein the first and second frame members are movable between image-capturing regions, during image-capturing, and a stowed position, set back farther than the image-capturing regions; and the cam-follower member, in the stowed position, opposes and is spaced from the frame members, and, in the image-capturing regions, the cam-follower member engages with the first frame member.

22. A lens housing comprising:

a rotatably-driven rotating-frame member, having cams, provided rotatably and movably in relation to an immobilized frame;

a first frame member provided in the rotating frame member, linearly movable in a direction corresponding to an optical axis in relation to the immobilized frame; and a cam-follower member, movably supported in the direction corresponding to the optical axis in relation to the rotating frame member and the first frame member, for varying a position in a direction corresponding to the optical axis of the first frame member by engaging with the first frame member and having a cam follower engaging with the cams of the rotating frame member, whereby a rotational driving force of the rotating frame member is converted and transmitted for moving the first frame member linearly.

23. A lens housing as claimed in claim 22, wherein the cam-follower member is arranged partially around while the lens housing is formed substantially entirely around the periphery about the optical axis.

24. A lens housing as claimed in claim 22, wherein the first frame member is movable between image-capturing regions, during image-capturing, and a stowed position, set back farther than the image-capturing regions; and the cam-follower member, in the stowed position, opposes and is spaced from the first frame member, and, in the image-capturing regions, engages with the first frame member.

* * * * *